(12) United States Patent
Marappan

(10) Patent No.: US 6,927,970 B2
(45) Date of Patent: Aug. 9, 2005

(54) UNIVERSAL INFRARED COUPLING DEVICE

(75) Inventor: Kumar Marappan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 10/631,069

(22) Filed: Jul. 31, 2003

(65) Prior Publication Data

US 2005/0024816 A1 Feb. 3, 2005

(51) Int. Cl.$^7$ ................................................ H05K 5/02
(52) U.S. Cl. ........................ 361/681; 710/64; 455/404; 235/486
(58) Field of Search ................................ 361/679–687, 361/724–727; 600/407; 710/64; 235/462.43, 462.45, 486, 454; 455/463, 466, 404

(56) References Cited

U.S. PATENT DOCUMENTS

| 5,708,560 | A | 1/1998 | Kumar et al. ............... 361/680 |
| 5,999,996 | A | 12/1999 | Dunn ........................... 710/64 |
| 6,108,200 | A | 8/2000 | Fullerton ..................... 361/686 |
| 6,255,800 | B1 * | 7/2001 | Bork ........................... 320/115 |
| 6,356,443 | B2 | 3/2002 | Jenks et al. ................. 361/686 |
| 6,532,148 | B2 | 3/2003 | Jenks et al. ................. 361/683 |
| 6,543,695 | B1 * | 4/2003 | Hamilton et al. ....... 235/462.43 |
| 2002/0193679 | A1 * | 12/2002 | Malave et al. ............. 600/407 |
| 2004/0212957 | A1 * | 10/2004 | Schedivy .................... 361/683 |

\* cited by examiner

Primary Examiner—Hung Van Duong
(74) Attorney, Agent, or Firm—David A. Mims, Jr.; Robert V. Wilder

(57) ABSTRACT

A handheld device cradle for holding a handheld device in a fixed position relative to the cradle includes a movable IR coupling transceiver selectively connected to a keyboard and selectively movable relative to the cradle to align with the IR port of a handheld device mounted on the cradle. A reflective element of the cradle apparatus is arranged to facilitate a satisfactory alignment of a handheld device with the cradle IR transceiver regardless of the location of the IR port on the handheld device. In an example, a full-sized keyboard is used to provide input to a handheld device which is mounted within the exemplary cradle apparatus to maintain IR port alignment between the cradle IR port and the handheld device IR port.

10 Claims, 4 Drawing Sheets

UNIVERSAL INFRARED COUPLING DEVICE

FIELD OF THE INVENTION

The present invention relates generally to infrared coupling systems and more particularly to a coupling apparatus and method for coupling handheld computing devices to keyboard devices.

BACKGROUND OF THE INVENTION

Handheld organizers and other handheld computer systems or handheld personal computers (PCs) have become a mainstay device for professionals to organize and process information with regard to day-to-day activities. Data input to such devices is tedious when a stylus is required. A foldable keyboard is a better option for data input but a full-sized foldable keyboard takes up desk space and generally a keyboard designed for use with one organizer or handheld computer system is not suitable or compatible for use with other systems. The sockets for handheld PCs are so unique that a single adapter could not be used to communicate keystrokes to various handheld devices.

The alternative to the use of hardwired ports is to use infrared (IR) to communicate keystrokes to handheld devices. However, for IR coupling, alignment of IR ports is critical. If there is misalignment of either the handheld device IR port or the keyboard IR port, relative to each other, the coupling is broken and there can be no transmission or reception of IR signals between the devices. Further, every handheld device which includes an IR port has the IR port in a different location on the device casing. Some IR ports are located on the top of the device, some are placed on the sides or even on the bottom of the device. Because of the different locations of the IR ports on the various handheld devices, positioning of the handheld devices relative to the coupled device (such as a keyboard) has been critical. Moreover, in order to position the IR port of the handheld device correctly with respect to an IR port of another device such as a keyboard, frequently the handheld device has to be placed in a position where it is difficult if not impossible to see a display screen on the handheld device while inputting keystrokes on a coupled full-sized keyboard.

Thus, there is a need for an improved methodology and system for enabling improved IR coupling between handheld devices and other external input and output devices.

SUMMARY OF THE INVENTION

In accordance with the present invention, there is provided a handheld device cradle for holding a handheld device in a fixed position relative to the cradle. In an exemplary embodiment, a movable IR coupling transceiver is selectively connected to a keyboard and selectively movable relative to the cradle to align with the IR port of a handheld device mounted on the cradle. A reflective element is implemented to facilitate a satisfactory alignment of a handheld device with the cradle IR transceiver regardless of the location of the IR port on the handheld device. In an example, a full-sized keyboard is used to provide input to a handheld device which is mounted within the exemplary cradle apparatus to maintain IR port alignment between the cradle IR port and the handheld device IR port.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
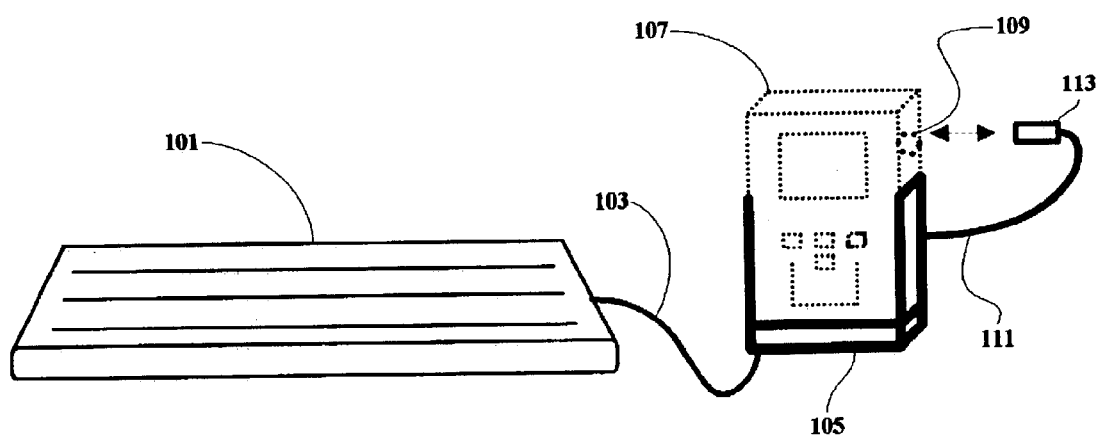
FIG. 1 is a schematic diagram illustrating a system which may be used in an exemplary implementation of the present invention.

It is noted that circuits and devices, including electrical, mechanical and light sensitive devices, which are shown in block form in the drawings, are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within any communication device capable of receiving and transmitting signals including infrared or "IR" signals, utilized in computer-based applications including personal digital assistants or PDAs, or other hand held devices (HHDs). In the present disclosure such devices include, but are not limited to, cellular and other wireless devices, personal digital assistant devices, laptop and hand held personal computers. The present discussion will be directed to a hand held device coupled to a full-sized keyboard although it is understood that the principles involved in the present invention may be applied, inter alia, to all of the above noted receiving and transmitting devices and systems.

Every hand held device or hand held computerized system (hereinafter collectively referred to as "hand held devices" or "HHD") has an infrared (IR) port located at a different position on the HHD. In accordance with the present invention, a cradle is provided for holding the HHD in a fixed position and includes means for fixedly aligning an IR port of the cradle with the IR port of the HHD to enable a fixed positional alignment and transmission of IR signals between the cradle and the HHD. The cradle also includes, in one example, means for connecting the cradle with a keyboard such that keystrokes or other input can be entered into the keyboard and a user can see the results of the entered keystrokes on a display portion of the HHD. In one embodiment, a reflective mirror is implemented to reflect IR signals between the cradle and the HHD. In another embodiment shown in FIG. 1, these signals are transmitted directly.

In FIG. 1 there is shown an exemplary system in which the present invention may be implemented. The illustration shows a keyboard 101 connected to a holding or cradle device 105 which is arranged to hold an HHD 107 shown in phantom. The HHD 107 includes an IR port 109. The cradle 105 also includes an IR port 113 which is arranged at the end of a flexible conduit 111. The flexible conduit 111 is of any type capable of bending into a desired position and maintaining that position until manually moved to another position. Flexible conduit 111 is similar to and may comprise flexible conduits or "necks" used in high intensity lamps and/or other reading lamps where the area being illuminated is determined by maneuvering the neck of the high intensity lamp so that the projected light is illuminating the material being read. Similarly, in the present example, the neck 111 is maneuvered such that the IR port 113 of the cradle device 105 is aligned with the IR port of the HHD 107. After the IR ports 109 and 113 are aligned, a communication link is established and IR signals may be transmitted and received between the two ports. The "stiffness" of the neck or flexible conduit maintains the proper alignment until the neck is manually moved to another position or the HHD 107 is removed from the cradle 105. The design of the cradle itself is shown only schematically in FIG. 1, it being understood that the cradle can take many forms to accomplish its mission of holding the HHD in a permanent position relative to the cradle 105 so that the IR ports 109 and 113 can be properly aligned. The cradle design can be a relatively open design to support the HHD and still enable IR port access and alignment no matter where the IR port happens to be located on any HHD. Once the ports are properly aligned, a user is enabled to enter keystrokes on the keyboard 101 and watch the display portion of the HHD 107 to see that the proper keystrokes are being entered.

Figure 2:
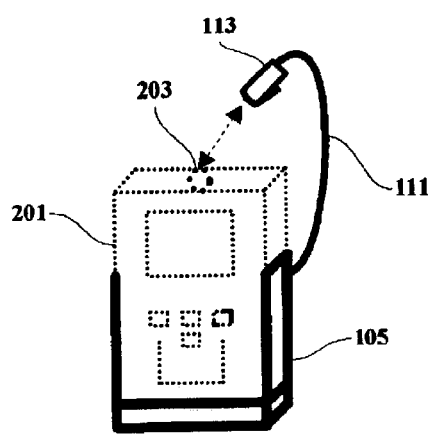
FIG. 2 is a schematic block diagram illustrating a variation of the arrangement shown in FIG. 1 in which the IR port of a handheld device is located in a different position.

In FIG. 2, a different HHD 201 is illustrated where the IR port 203 of the HHD 201 is located at the top of the HHD 201. In that case, the flexible conduit 111 of the cradle 105 is manually manipulated to the position shown at the top of the HHD 201 such that the IR port of the HHD 201 is properly aligned with the IR port 113 of the cradle 105. Again, the alignment is maintained by the flexible conduit 111 until manually moved to a different position. By using the flexible conduit 111, a user is enabled to type on the keyboard 101 and watch the display of the HHD and the two IR ports will not become accidentally misaligned.

Figure 3:
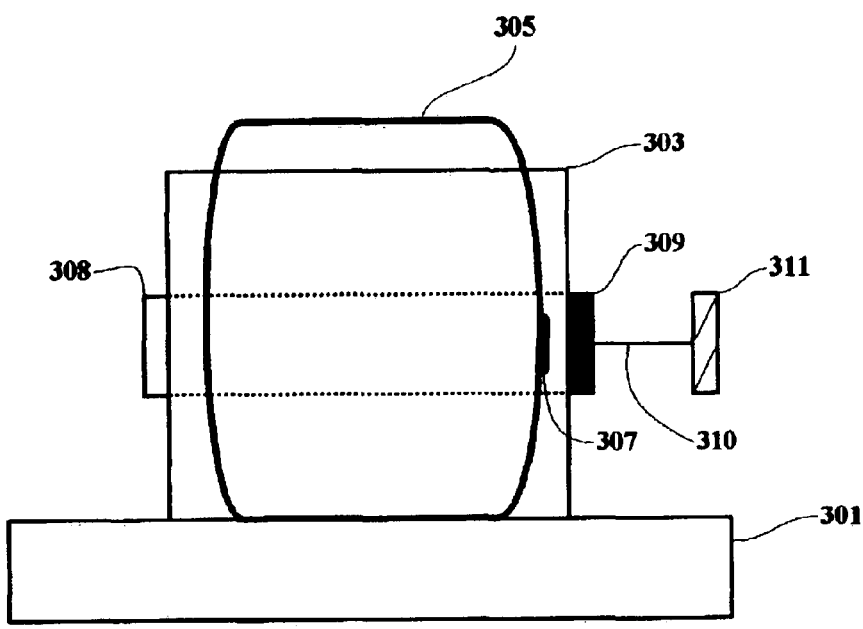
FIG. 3 is a schematic diagram illustrating a front view of various components of the IR coupling system.

In another embodiment shown in FIG. 3, instead of a flexible neck, a sliding, rotating action in combination with a reflective mirror is used to accomplish the same purpose of steady-state or fixed IR port alignment. As shown in FIG. 3, a cradle base 301 includes an upper support member 303 for holding an HHD 305 in a fixed position relative to the cradle. The HHD 305 includes an IR port 307 which is arranged on the side of the HHD305. The cradle includes a movable arm 308 to which is attached an IR port 309. A reflecting mirror 311 is also attached to the rotating arm 308 by a flexible connector 310. The flexible connector 310 is adjustable for connecting the mirror 311 and the port housing or movable arm 308. The distance between the reflective mirror 311 and the IR port 309 is adjustable by means of a sliding arrangement. The angle at which the mirror 311 faces the IR port 309 is also adjustable. This arrangement enables the cradle to work with any HHD irrespective of the location of the IR port on the HHD. The mirror 311 may be rotated such that IR signals from the IR port 307 of the HHD 305 are transmitted from the IR port 307 and reflected by the mirror 311 onto the IR port 309 of the cradle. The mirror 311 may be rotated to accommodate alignment with the IR port of the HHD 305 no matter how thick the HHD 305 is. The movable arm 308 may also be moved vertically and rotated using a variety of known bracket devices (not shown for clarity) to facilitate IR port alignment no matter where the IR port of the HHD is located on the HHD. The bracket for example may be similar to brackets commonly used with cell phone holders which allow rotation as well as up and down movement of a cell phone holder.

Figure 4:
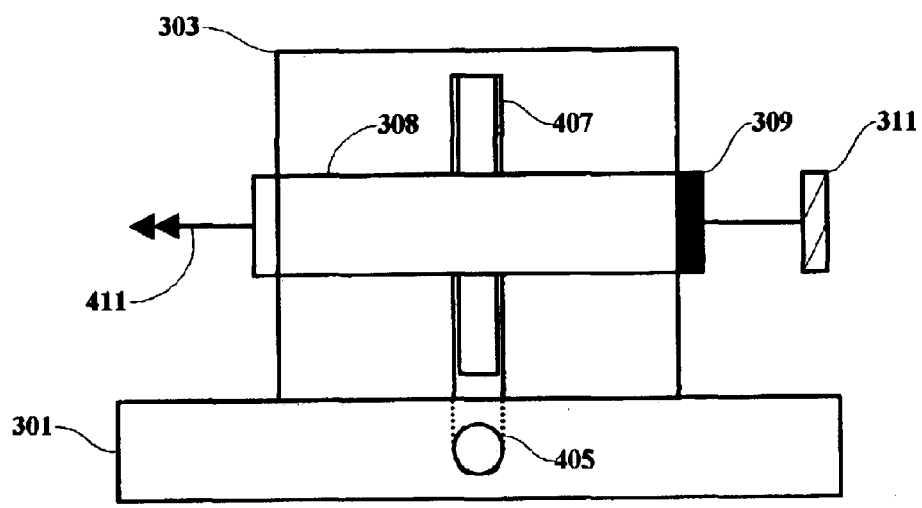
FIG. 4 is a schematic diagram illustrating a back view of the hand held device cradle.

FIG. 4 shows a rear view of the cradle without the HHD 305. The cradle base 301 includes an opening 405 to receive power cables to supply power for the power requirements of the electronics within the cradle. The electronics for the cradle include processing means for translating keystroke-generated signals into IR signals for transmission over the IR coupling to the HHD. In the present example, the cradle electronics are conveniently housed within the housing of the rotating arm 308 and power is supplied through a metallic lining 407 to provide power to the IR port 309. At the other end of the arm 308 is, in the present example, a PS/2 port 411 which is also supplied power through the lining 407, and connects to the keyboard.

Figure 5:
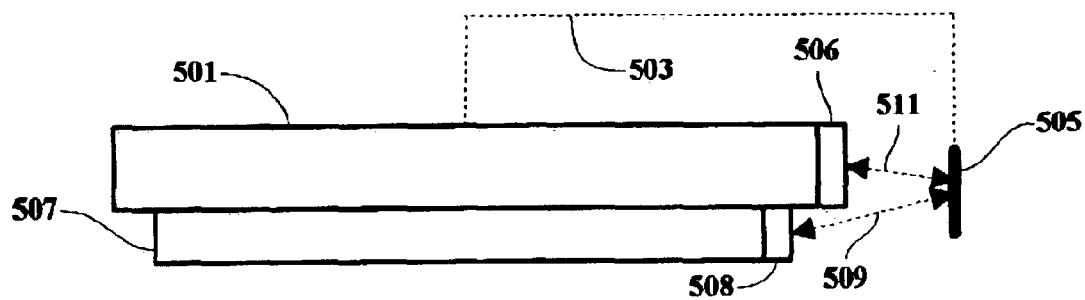
FIG. 5 is a schematic diagram illustrating the function of a reflective mirror used in one embodiment of the hand held device coupling system.

FIG. 5 illustrates schematically, a top view of the reflections of the IR signals between the IR port 506 of the cradle arm 501 and the IR port 508 of a HHD 507. As shown, a reflecting mirror 505 is mechanically coupled 503 to the cradle arm 501. The mirror 505 is manually adjusted by a user such that IR signals from the IR port 506 are directed 511 to the mirror 505 and re-directed 509 to the IR port 508 of the HHD 507. The mirror adjustment is a final adjustment for alignment after the movable arm 501 has been conveniently positioned relative to the location of the IR port on the HHD such as to enable a final adjustment of the mirror 505 and the IR alignment of the ports 506 and 508 via the mirror 505.

Figure 6:
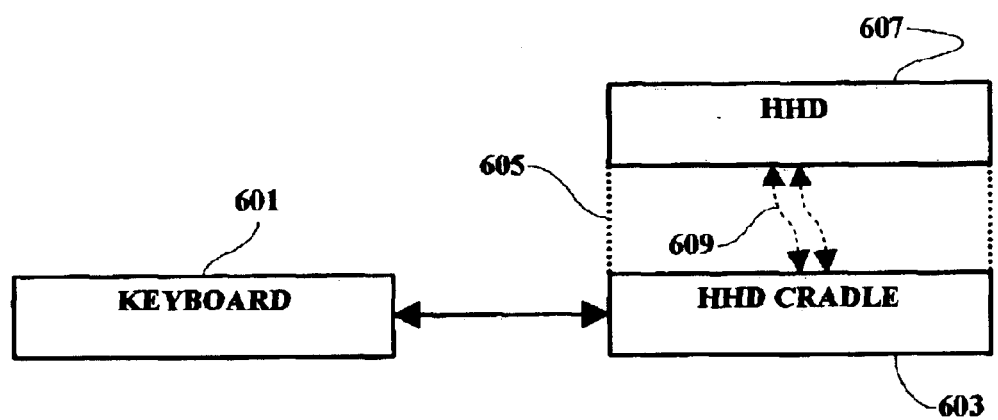
FIG. 6 is a schematic diagram illustrating the various mechanical, electrical and light path relationships utilized in the exemplary embodiment.

FIG. 6 illustrates the relative connection relationships among the keyboard 601 which is connected electrically to a HHD cradle 603, which in turn, is arranged to mechanically hold 605 the HHD 607 and also communicate with the HHD 607 through an IR coupling 609. It is noted that the keyboard 601 may also be coupled to the cradle 603 using an IR coupling rather than being hard-wired as shown.

Figure 7:
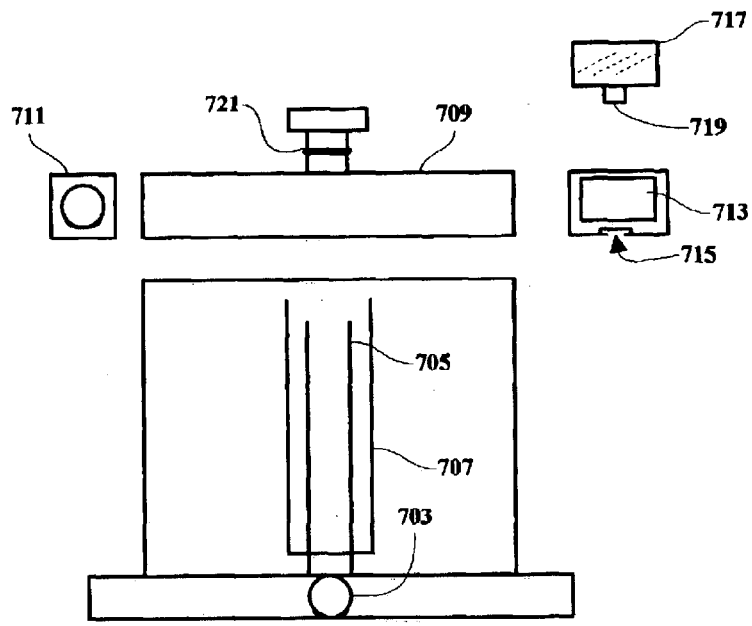
FIG. 7 is an exploded view of the various components used in an exemplary embodiment of the hand held device cradling system.

In FIG. 7, an exploded view of the HHD cradle device is illustrated. The cradle in the present example includes a power inlet 703 connected to a metallic lining 705 to provide power to the ports. Also shown is a slot 707 in which the movable arm housing 709 will move up and down and also rotate to the desired position. At one end of the port housing or movable arm 709 is a PS/2 port 711 and at the other end is the IR port 713 of the cradle assembly. A reflective mirror 717 and holder 719 are arranged to slide along the length of the port housing. The right side of the movable arm also includes a slot or grove 715 to enable the mirror holder to slide therein. A metallic ring 721 is electrically connected to the metallic lining 705 and arranged to allow for power conduction to the circuits within the port housing or movable arm 709.

Figure 8:
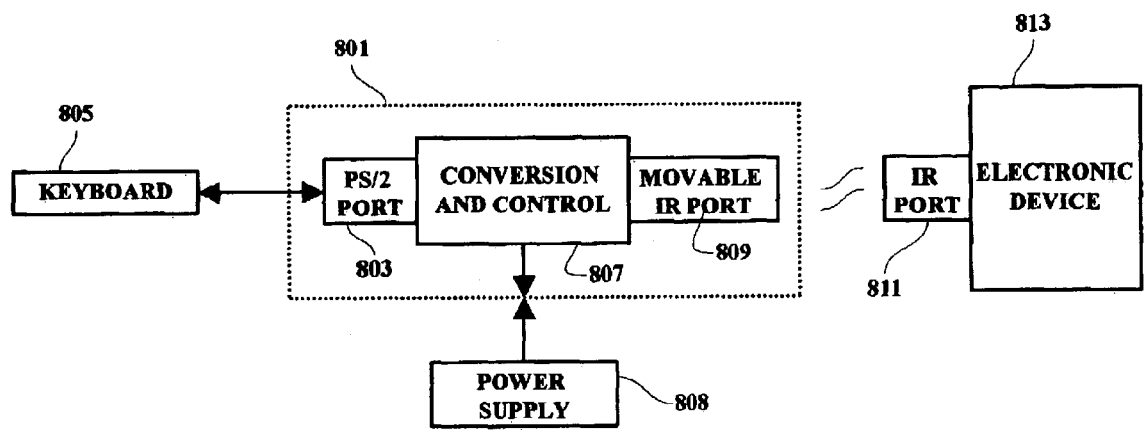
FIG. 8 is a block diagram of an exemplary embodiment of a system including the present invention.

As shown in FIG. 8, an exemplary system which includes the present invention, shows a holding apparatus 801 which is arranged to hold an electronic device 813 such as a HHD in place relative to the holding apparatus. The holding apparatus includes a PS/2, USB or other external port 803 which in the example is connected to a keyboard 805. Port 803 is connected to a Conversion and Control circuit 807 which is also housed in the holding apparatus 801 and effective to convert and control signal flow between the keyboard 805 and the electronic device 813. The Conversion and Control circuitry is arranged for selective connection to a power source 808 as hereinbefore described in FIG. 4. The Conversion and Control circuit is connected to the movable IR port 809 which communicates with a corresponding IR port 811 of electronic device 813.

The method and apparatus of the present invention has been described in connection with a preferred embodiment as disclosed herein. The disclosed methodology may be implemented in a wide range of embodiments to accomplish the desired results as herein illustrated. Although an exemplary embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific exemplary form as set forth herein, but on the contrary, it is intended to cover such alternatives, modifications, and equivalents, as can be reasonably included within the spirit and scope of the invention.

What is claimed is:

1. An apparatus for holding an electronic device, said electronic device including an infrared (IR) port arranged to receive IR signals, said apparatus comprising: means for holding the electronic device in place relative to said apparatus; and a movable IR port, said movable IR port being selectively movable relative to said electronic device for positioning said movable IR port relative to said IR port of said electronic device whereby said movable IR port is enabled to transmit IR signals to said IR port of said electronic device, said apparatus further including means for selectively maintaining a position of said movable IR port relative to said IR port of said electronic device, said means for selectively maintaining comprises a flexible conduit capable of retaining a shape in which said flexible conduit is arranged.

2. The apparatus as set forth in claim 1 wherein said movable IR port is connected to a terminal port of said apparatus, said terminal port being arranged for connection to an external input system whereby input from said external input system is transmitted from said movable IR port to said IR port of said electronic device.

3. The apparatus as set forth in claim 1 wherein said flexible conduit includes means connecting said movable IR port with said terminal port.

4. The apparatus as set forth in claim 1 and further including a reflective device positioned relative to said movable IR port and said IR port of said electronic device such that IR signals from said movable IR port of said electronic device such that IR signals from said movable IR port are reflected by said reflecting device to said IR port of said electronic device.

5. The apparatus as set forth in claim 2 wherein said external input system is a keyboard device.

6. The apparatus as set forth in claim 4 wherein said reflecting device is selectively adjustable to reflect IR signals from said movable IR port to said IR port of said electronic device.

7. The apparatus as set forth in claim 6 wherein said movable IR port is mounted on a movable arm, said movable arm being arranged to slide along a track of said apparatus to position said movable IR port at various positions along one dimension of said electronic device.

8. The apparatus as set forth in claim 7 and further including means arranged for connection to a power supply for supplying power to electrical components within said apparatus.

9. A system comprising: an electronic device capable of receiving infrared (IR) signals; and an apparatus for holding said electronic device, said apparatus comprising: means for holding said electronic device in place relative to said apparatus; and a movable IR port, said movable IR port being selectively movable relative to said electronic device whereby said movable IR port is enabled to transmit IR signals to said IR port of said electronic device, said apparatus further including means for selectively maintaining a position of said movable IR port relative to said IR port of said electronic device, said means for selectively maintaining comprises a flexible conduit capable of retaining a shape in which said flexible conduit is arranged.

10. The system as set forth in claim 9 and further including a keyboard device connected to said apparatus whereby signals generated at said keyboard device are transmitted through said movable IR port of said apparatus to said IR port of said electronic device.

* * * * *